No. 765,520. PATENTED JULY 19, 1904.
A. L. STINVILLE.
PROCESS OF MAKING SULFURIC ACID.
APPLICATION FILED JAN. 21, 1903.
NO MODEL.
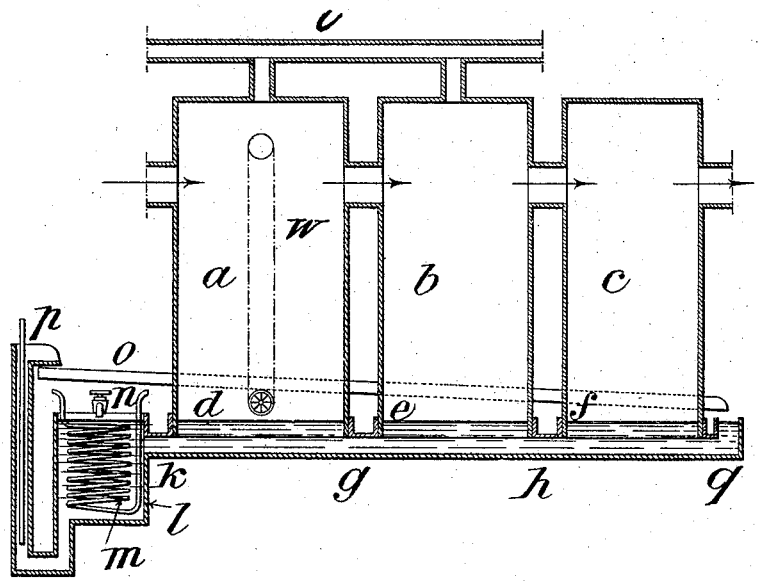
WITNESSES:
W. M. Avery
Walton Harrison
INVENTOR
Auguste Lucien Stinville
BY
Munn
ATTORNEYS.

No. 765,520.

Patented July 19, 1904.

UNITED STATES PATENT OFFICE.

AUGUSTE LUCIEN STINVILLE, OF PARIS, FRANCE.

PROCESS OF MAKING SULFURIC ACID.

SPECIFICATION forming part of Letters Patent No. 765,520, dated July 19, 1904.

Application filed January 21, 1903. Serial No. 139,916. (No specimens.)

*To all whom it may concern:*

Be it known that I, AUGUSTE LUCIEN STINVILLE, a citizen of the Republic of France, residing at 10 Rue Chimonnier, Paris, in the Republic of France, have invented certain new and useful Improvements in the Manufacture of Sulfuric Acid by and in Lead Chambers, of which the following is a specification.

In the manufacture of sulfuric acid by and in lead chambers it is now known that the surface of the sides is of far greater importance than the volume of the chambers. In fact, being given a system of chambers of a certain volume, the quantity of acid manufactured will depend on the speed of the chemical reactions which are producing this acid. This speed of reaction is in proportion for a like temperature of the total nitrous-acid vapors in motion per day. Consequently as the introduction of these nitrous-acid vapors in greater or less quantity can be regulated by the operator it will be understood that by means of the said regulation one has to a certain extent the faculty of varying the speed of reaction for a determined capacity of the apparatus. On the other hand, the amount of heat given off by the reactions can only be eliminated by the sides which transmit it to the surrounding air, so the speed of this elimination depends chiefly on the surface of the sides, the means for increasing the same, such as the establishment of a current of air or the sprinkling of the sides with water, being comparatively costly on account of their low efficiency.

Without artificial refrigeration the manufacture heretofore has thus been limited to the surface of the sides. The best results obtained in our latitude appear to be the manufacture of one ton of one thousand kilograms of acid at 53° Baumé per twenty-four hours for eighty square meters of surface of either plane or circular sides.

The best-known apparatus for suitably cooling the gases, and consequently for increasing the production of a given system of lead chambers, is that form of tower in which use is made of the extremely energetic exchange of temperatures between the gases and the acid without interposition; but this apparatus offers inconveniences, which are the comparatively high cost, the expense of motive power to bring the acid up, and especially the enormous loss of draft which almost unavoidably requires recourse to be had to mechanical suction.

My invention has for its object to secure the same results as those obtained by the Lunge tower (described in Dr. Lunge's *Theoretical and Practical Treatise on Manufacture of Sulphuric Acid*, Vol. 1, second edition, page 381)—that is to say, the increase of the quantity of acid manufactured in a given system of lead chambers, while diminishing considerably at the same time the quantity of water-vapor injected for the reactions and doing away entirely with or reducing to a minimum the hereinbefore-mentioned inconveniences offered by the towers.

The quantity of water required for the reactions in the divers known processes is supplied in the chambers partly (to the extent of fifteen to fifty per cent.) by the hot gases of the kilns passing through a Glover tower or other similar apparatus and for the remainder (eighty-five to fifty per cent.) by the steam of a boiler or by the exhaust-steam from an engine.

In the present process the water is also partly supplied by the hot gases of the kilns passing through a Glover or other tower, (fifteen to fifty per cent.,) partly by boiler or exhaust engine-steam, and for the remainder by the evaporization of diluted and cooled acid circulating in the dishes of the chambers. By means of this latter source of water the injection of boiler or exhaust engine-steam into the chambers can be very much reduced, thus effecting a great saving.

My process consists, essentially, in establishing in the dish or dishes of the lead chambers a more or less active circulation of acid at such a strength and temperature that its tension of water-vapor shall be sufficient to supply by evaporation the quantity of water-vapor required for the reactions. As the tension of water-vapor depends simultaneously on the degree of concentration and on the degree of temperature, the contrivances used for carrying out my process allow of regulating the degree of concentration by the addition of water and the degree of temperature by refrigeration. A like degree of vapor tension can be obtained at divers temperatures provided the strength shall correspond. It will be preferable to take the lowest possible temperatures.

In practice the temperature and the degree of concentration are bound together by this condition, that while lowering the temperature as much as possible the mixture of acid and water must only allow to evaporate the quantity of water strictly required for the reactions. If the mixture is very cold and contains but little water, it can cool as much as if it were not so cold and more diluted; but in the first case it may not supply a sufficient quantity of water-vapor, and in the second case it may supply too much water-vapor, so there is a more favorable proportion to observe in each plant and sometimes in each chamber.

While a lead chamber fed with water exclusively by the gases in the kiln and by a boiler or exhaust engine-steam supplies normally a given weight of acid at a definite number of degrees Baumé per day, the present process causes the circulation through the chambers of a weight of acid four or five times as great and having a density lower by 3° to 5° Baumé and a temperature lower by 15° to 25° centigrade than the gases in the chambers. Besides the greater turn-out given by the chambers in my process a great decrease is obtained in the quantity of steam to be introduced into the chambers for a determined production of acid.

In the accompanying drawing I have shown by way of example and in sketch a contrivance for carrying out my process.

$a\ b\ c$ represent a system of three lead chambers, which are passed through by the gases from the Glover tower at $a$ and on their way from $c$ to the Gay-Lussac tower.

$d\ e\ f$ are the pans or dishes into which the chambers dip. Between the dishes are established communications $g\ h$, presenting as little resistance as possible. The head of the dish $d$ of the first chamber is connected by a pipe $k$ with a refrigerating device $l$, in the worm $m$ of which the current of cold water circulates upwardly. The acid coming into $l$ is there diluted by a flow of water from the cock $n$ and moves down in becoming cooler, to be raised up afterward as far as $o$ by an acid-raising device $p$. The gutter $o$ conducts the cold and diluted acid into a receptacle $p$, which is in communication with the tail end of the last chamber $c$.

It only requires to operate the device $p$ to determine a circulation of cold and diluted acid on the total area of the surface of the dishes of the chambers. Furthermore, the circulation of the gases, their reactions, the taking in one of the chambers of a certain part of the condensed acid, and its transfer to the Glover tower are brought about in the usual manner. The bottom of the dishes may be provided with partitions to insure the methodical circulation of the acid. The refrigeration device $l$ may be replaced by any other system of refrigeration, whether liquid or gaseous. The raising device $p$ may also be replaced by any other system for raising the acid, whether an acid egg, a pump, or an injector. The refrigerating apparatus $l\ m$ can be placed directly in the bath of the dishes, the diluting-water being introduced into the said bath by any suitable means. The flow of water at $n$ can be automatically regulated by a density-regulator. Finally, in compliance with the theories of Lunge and of Sorel, according to which the temperature, and consequently the production of acid, vary all along the system of chambers, there may be established intermediate introductions of cold and diluted acid from the gutter $o$ to the points where the reactions become less active.

I claim—

The process for the manufacture of sulfuric acid in lead chambers which consists in causing to circulate in the dishes of the said chambers acid having a density of 3° to 5° Baumé below the density of the acid produced on the vertical sides, and having a temperature of 15° to 20° centigrade lower than the temperature of the gases in the chambers.

In testimony that I claim the foregoing as my invention I have signed my name in presence of two subscribing witnesses.

AUGUSTE LUCIEN STINVILLE.

Witnesses:
AUGUSTUS E. INGRAM,
MAURICE ROUX.